(12) United States Patent
Kanematsu et al.

(10) Patent No.: US 8,352,182 B2
(45) Date of Patent: Jan. 8, 2013

(54) MAP DATA PROCESSOR AND METHOD FOR PROCESSING INFORMATION BASED ON MAP DATA

(75) Inventors: Osamu Kanematsu, Nagoya (JP); Takeshi Shikimachi, Kariya (JP)

(73) Assignee: DENSO CORPORATION, Kariya (JP)

( * ) Notice: Subject to any disclaimer, the term of this patent is extended or adjusted under 35 U.S.C. 154(b) by 447 days.

(21) Appl. No.: 12/591,566

(22) Filed: Nov. 24, 2009

(65) Prior Publication Data

US 2010/0138143 A1 Jun. 3, 2010

(30) Foreign Application Priority Data

Dec. 3, 2008 (JP) ................................ 2008-308573

(51) Int. Cl.
*G01C 21/32* (2006.01)
*G01C 21/02* (2006.01)
(52) U.S. Cl. ......... 701/451; 701/450; 701/540; 707/812
(58) Field of Classification Search .................. 701/408, 701/532, 534, 540, 450, 446, 445, 430, 452, 701/451, 421, 420; 707/758, 812; 340/995.18
See application file for complete search history.

(56) References Cited

U.S. PATENT DOCUMENTS

| | | | |
|---|---|---|---|
| 7,403,852 B2 * | 7/2008 | Mikuriya et al. | 701/532 |
| 2004/0267441 A1 * | 12/2004 | Kim | 701/200 |
| 2006/0111837 A1 | 5/2006 | Tauchi | |
| 2006/0217879 A1 * | 9/2006 | Ikeuchi et al. | 701/208 |
| 2008/0120171 A1 * | 5/2008 | Ikeuchi et al. | 705/13 |
| 2008/0162041 A1 * | 7/2008 | Nakamura | 701/209 |
| 2009/0019095 A1 * | 1/2009 | Asahara et al. | 707/203 |
| 2009/0319174 A1 * | 12/2009 | Ishigami et al. | 701/201 |

FOREIGN PATENT DOCUMENTS

| | | |
|---|---|---|
| JP | A-06-088733 | 3/1994 |
| JP | A-10-019589 | 1/1998 |
| JP | A-2003-315054 | 11/2003 |
| JP | A-2004-138624 | 5/2004 |
| JP | 2004-286641 A | 10/2004 |
| JP | A-2005-122003 | 5/2005 |
| JP | A-2005-172578 | 6/2005 |
| JP | A-2006-220449 | 8/2006 |

OTHER PUBLICATIONS

Office Action mailed Oct. 19, 2010 issued from the Japan Patent Office for corresponding Japanese patent application No. 2008-308573 (English translation enclosed).
Search Report dated on Apr. 1, 2010 issued from the British Patent Office in the corresponding British patent application No. GB0921239.0.

* cited by examiner

*Primary Examiner* — Christine Behncke
(74) *Attorney, Agent, or Firm* — Posz Law Group, PLC

(57) ABSTRACT

A map data processor includes: a road map database storing a road map data having a link data with setting information of the link and road network information with connection information between links; a communication element obtaining a new link data with connection object setting information of a connection object link and coordinate information of one end of the new link from an external device; and a controller. The controller extracts a link data of a link in a predetermined geographical area with a center of the one end of the new link. The controller determines that the new link is connected to an extracted link when the connection object setting information matches the setting information of the extracted link data. The controller registers the new link data and connection information between the new link and the connection object link in the road map data.

6 Claims, 3 Drawing Sheets

MAP DATA PROCESSOR AND METHOD FOR PROCESSING INFORMATION BASED ON MAP DATA

CROSS REFERENCE TO RELATED APPLICATION

This application is based on Japanese Patent Application No. 2008-308573 filed on Dec. 3, 2008, the disclosure of which is incorporated herein by reference.

FIELD OF THE INVENTION

The present invention relates to a map data processor for processing information based on map data and a method for processing information based on map data.

BACKGROUND OF THE INVENTION

Conventionally, a map data processor for executing various processes with utilizing map data stored in a memory medium obtains new map data from an external system via a communication system. Based on the new map data, a map database stored in the memory medium is up-dated. Here, the map data processor is, for example, a navigation device. When a new road and/or a new facility are constructed, the map data processor obtains information about the new road and the new facility in each case so that the map database is up-dated with utilizing the information. Thus, the convenience of the map data processor is improved.

The map data processor is disclosed in, for example, JP-A-2003-315054. A navigation device in JP-A-2003-315054 receives a part of new version map data, which is divided in each predetermined region, from an external data center, so that a database in the processor is up-dated in each region.

Further, when the map data is up-dated, the processor obtains a part of new data for up-dating, which is divided in each link, from the external system. Here, the link is a minimum unit of road regions, and the part of the new data in each link is defined as a new link data. Based on the new link data, the map database is up-dated.

Thus, the new link data obtained from the external system is added to the map database stored in the memory medium. When the map database is utilized, it is necessary to connect the new link with a road network defined in the map database. In this case, it is necessary to specify a link ID as an identification information of an existing link to be connected with the new link so that the new link is incorporated in the existing road network. However, the link ID defining the existing link in the database is available for the present map database, to which the link belongs. Thus, the link ID lacks generality. Accordingly, a provider for providing a new link data to a user has to obtain a specific link ID of the map database of the user. Unless, it is difficult to specify the link ID for obtaining connection relationship between the new link and the existing link. Thus, the provider cannot incorporate the new link into the map network of the user if the provider does not know the information about the connection relationship. Thus, it is inconvenient for both of the provider and the user to utilize the new link ID.

SUMMARY OF THE INVENTION

In view of the above-described problem, it is an object of the present disclosure to provide a map data processor for processing information based on map data. The processor obtains connection relationship between a new link and an existing link in the map data without utilizing specific identification information of a map database. It is another object of the present disclosure to provide a method for processing information based on map data.

According to a first aspect of the present disclosure, a map data processor includes: a road map database storing a road map data, which includes a link data and road network information, wherein the link data defines a link as an minimum unit of a road segment in the road map data, and includes setting information showing setting status of the link, and wherein the road network information includes connection information showing connection status between links; a communication element for obtaining a new link data from an external device, wherein the new link data defines a new link, and includes connection object setting information and coordinate information, wherein the connection object setting information shows setting information of a connection object link to be connected to the new link, and wherein the coordinate information shows coordinates of one end of the new link; and a controller. The controller extracts a link data from the road map data, the link data relating to a link, which is disposed in a predetermined geographical area with a center of the coordinates of the one end of the new link. The controller compares the connection object setting information of the new link data with setting information of an extracted link data, and determines that the new link is connected to an extracted link when the connection object setting information of the new link data matches the setting information of the extracted link data. The controller registers the new link data and connection information between the new link and the connection object link in the road map data. The controller executes a predetermined process with using the road map data.

In the above device, with using the coordinates of the one end of the new link to be connected to the connection object link and the connection object setting information including general information such as road name and road type, the controller determines whether the new link is connected to the extracted link without using the specific identification information of the road map database. Thus, even when the external device does not store the specific identification information, the map data processor can obtain the new link data from the external device without difficulty. Thus, since the connection object link of the new link is specified with using the general information such as the coordinates and the connection object setting information, the map data processor can freely utilize the new link data freely. Thus, the device can update the road map data with using the new link data obtained from the external device, and therefore, the convenience of the device is improved.

Alternatively, the controller may include an extracting means, a connection determination means, and a register means. The extracting means is configured to extract the link data. The connection determination means is configured to compare the connection object setting information with the setting information of the extracted link data, and to determine whether the new link is connected to the extracted link. The register means is configured to register the new link data and the connection information in the road map data. The connection object setting information shows setting information of a connection object link to be connected to the new link without using a specific ID defined in the road map database.

Alternatively, the setting information of the extracted link data may include shape information of the extracted link. The connection object setting information of the new link data may include shape information of the connection object link. The controller further compares the shape information of the extracted link with the shape information of the connection object link, and determines that the new link is connected to an extracted link when the connection object setting information of the new link data matches the setting information of the extracted link data, and the shape information of the extracted link matches the shape information of the connection object link. In this case, connection between the new link and the extracted link is accurately determined.

Alternatively, the setting information of the extracted link data may include at least one of a road name, a road type and a road width, and the connection object setting information of the new link data may include at least one of a road name, a road type and a road width.

Alternatively, the map data processor may be a navigation device for guiding a route from a starting point to a destination based on the road map data, and the predetermined process executed by the controller is route navigation.

According to a second aspect of the present disclosure, a method for processing information based on a map data includes: storing a road map data, which includes a link data and road network information, wherein the link data defines a link as an minimum unit of a road segment in the road map data, and includes setting information showing setting status of the link, and wherein the road network information includes connection information showing connection status between links; obtaining a new link data from an external device, wherein the new link data defines a new link, and includes connection object setting information and coordinate information, wherein the connection object setting information shows setting information of a connection object link to be connected to the new link without using a specific ID defined in the road map database, and wherein the coordinate information shows coordinates of one end of the new link; extracting a link data from the road map data, the link data relating to a link, which is disposed in a predetermined geographical area with a center of the coordinates of the one end of the new link; comparing the connection object setting information of the new link data with setting information of an extracted link data, and determining that the new link is connected to an extracted link when the connection object setting information of the new link data matches the setting information of the extracted link data; registering the new link data and connection information between the new link and the connection object link in the road map data; and guiding a route from a starting point to a destination based on the road map data.

In the above method, with using the coordinates of the one end of the new link to be connected to the connection object link and the connection object setting information including general information such as road name and road type, it is determined determines whether the new link is connected to the extracted link without using the specific identification information of the road map database. Thus, even when the external device does not store the specific identification information, the new link data is obtained from the external device without difficulty. Thus, since the connection object link of the new link is specified with using the general information such as the coordinates and the connection object setting information, the new link data is freely utilized. Thus, the method provides to update the road map data with using the new link data obtained from the external device, and therefore, the convenience of the is improved.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
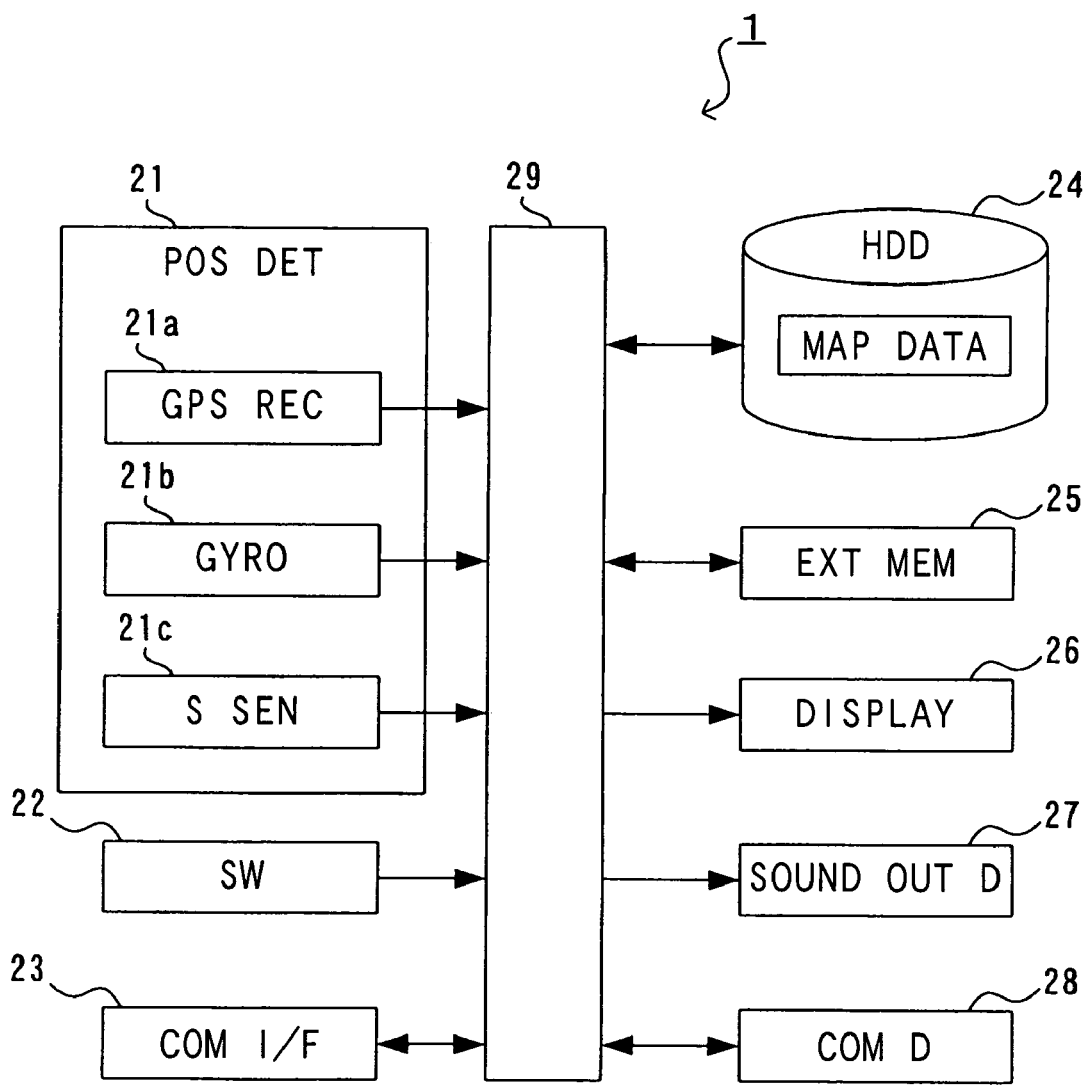
FIG. 1 is a block diagram showing a navigation device.

FIG. 1 shows a navigation device 1 according to an example embodiment.

The device 1 is a navigation system mounted on a vehicle. As shown in FIG. 1, the device 1 includes a position detector 21, an operation switches 22, a communication interface 23, a hard disk drive (HDD) 24, an external memory 25, a display 26, a sound output device 27, a communication device 28 for communicating an external system, and a controller 29. The position detector 21 detects a current position of the vehicle. The operation switches 22 inputs various instruction from a user into the device 1. The hard disk drive 24 functions as a mass storage system for storing a map data, a program and the like. The external memory 25 stores various information. The display 26 displays various information such as a map image on a screen. The sound output device 27 outputs various sound such as voice guidance and voice message.

The position detector 21 includes a GPS receiver 21a, a gyroscope 21b and a vehicle speed sensor 21c. The GPS receiver 21a receives a signal from an artificial satellite for GPS (global positioning system), and detects a position coordinates and an altitude of the vehicle. The gyroscope 21b outputs a detection signal corresponding to an angular speed of rotational movement applied to the vehicle. The speed sensor 21c outputs a detection signal corresponding to the vehicle speed of the vehicle. Based on the output signals from the GPS receiver 21a, the gyroscope 21b and the speed sensor 21c, the controller 29 calculates a current position, a driving direction and a current speed of the vehicle. A method for calculating the current position based on the output signal from the GPS receiver 21a may be a point positioning method or a differential positioning method.

The switches 22 may include a touch switch on a touch panel and a mechanical switch such as a key switch arranged around the display 26. The touch switch in the touch panel is integrated with a screen of the display 26. The communication I/F 23 connects the navigation device 1 with a periphery device so that the device 1 transmits various information to and receives various information from the periphery device. For example, the communication I/F 23 is a USB (universal serial bus).

The HDD 24 is an external memory device for reading out data from the hard disk based on a control signal from the controller 29 and for writing data into the hard disk. The data stored in the HDD 24 includes a node data, link data, road map data, drawing data, map matching data, route guidance data, a program for operating the navigation device 1, a image design data, and the like. The node data relates to a node corresponding to a specific point such as an intersection. The link data relates to a link as a minimum unit of road segments, and the link connects between two adjacent nodes. The road map data includes road network data including link connection information. The drawing data is necessary to display the map image. The link data for providing the road network includes definition information and physical information. The definition information defines universal setting contents regarding the road corresponding to each link. The physical information defines a shape and a position (i.e., coordinates)

of the road. The setting contents defined in the definition information of each link are, for example, a name of a road such as Route 66 and Pennsylvania street, a type of a road such as a interstate highway, a state route, a city road and the like, a road width and the like.

The external memory 25 stores various data. The external memory 25 is a memory device such as a non-volatile semiconductor memory so that stored information is rewritable electrically or magnetically, and held even when a power source turns off. The display 26 is a color display device having a screen such as a liquid crystal display. The display 26 can display various images according to an input image signal from the controller 29. The display 26 displays a map image, a guiding route from a start point to a destination, a vehicle mark for showing a current position of the vehicle, and other guidance information. The sound output device 217 informs an user with various sound and voice messages. Thus, various guidance such as turning direction guidance in route guidance is performed with both of the image in the display 26 and the sound and the voice message from the sound output device 27.

The communication device 28 obtains information from an external communication system and information memory medium via a wireless communication system. The communication device 28 is, for example, an optical beacon and a radio wave beacon mounted on a roadside, a receiver for a VICS (vehicle information and communication system) that receives information transmitted by a FM multiple broadcasting system, a cell phone, a ETC (electronic toll collection) in-vehicle unit, an information communication terminal equipment having a Bluetooth function, or the like. Here, "Bluetooth" is a registered trademark. Although the device 1 includes the external communication device 28, the device 1 may include an optical device instead of the communication device 28. The optical device such as a camera reads a two-dimensional bar-code stored in the memory medium so that the optical device obtains information from an external system.

The controller 29 is a conventional micro computer having a CPU, a ROM, a RAM, an I/O device, and a bus line for connecting among the CPU, the ROM, the RAM and the I/O device. The controller 29 controls the above elements in the device 1. The controller 29 executes various processes based on a program and data input from the ROM, the HDD 24 and the external memory 25.

The HDD 24 functions as a road map database, the communication I/F device 23 and the external communication device 24 function as information obtaining element, the controller 29 functions as a retrieve element, a connection determining element, and a register element.

Next, the process executed by the controller 29 will be explained as follows.

The process regarding navigation is, for example, a map display process, and a route guidance process. In the map display process, based on the detection signal from the position detector 21, the current position of the vehicle is calculated. Further, based on the road map data and the drawing data around the vehicle input from the HDD 24, the map image is generated. Then, the map image around the current position of the vehicle is displayed on the display 26. Further, the controller 29 controls the display 26 to display a mark representing the current position of the vehicle on the map image on the display 26 so that the mark is overlapped on the map image. The current position is detected based on the detection signal from the position detector 21. The controller 29 controls the display 26 to move the mark of the current position on the map image according to movement of the vehicle. Further, the controller 29 controls the display 26 to scroll the map image.

In the route guidance process, the user operates the operation switches 22 so as to set the destination. Then, the controller 29 sets the current position of the vehicle as the starting point, and further, searches an optimum route from the starting point to the destination based on the road map data input from the HDD 24. Then, the optimum route obtained by the route search process is defined as a guiding route, and the guiding route is displayed on the display 26 together with the map image. The controller 29 displays guide information and/or outputs guide voice message or guiding sound with a predetermined timing as the vehicle proceeds. Thus, the device 1 guides the route so as to drive the vehicle along with the guiding route from the starting point to the destination.

Further, the device 1 obtains a new link data, which is not registered in the road map data stored in the HDD 24. The new link data is input from the communication I/F 23 and the external communication device 28. The device 1 has a new link register function so that the new link corresponding to the obtained new link data is connected to the road network, and the new link data is registered in the road map data.

The new link data may be obtained from, for example, an external information center and/or an information communication terminal, which are wirelessly communicated with the navigation device 1 via the external communication device 28, or a memory device such as a memory card connecting to the navigation device 1 via the communication I/F 23. Alternatively, the new link data may be obtained from a memory medium such as a document and a publication, in which a two-dimensional code is printed. The new link data is converted into the two-dimensional code, and the two-dimensional code is read out by a camera or the like.

The controller 29 executes a new link connection determination process as a specific process of the new link register function. Specifically, the controller 29 specifies the existing links to be connected to the new link based on the connection object information and the physical information in the new link data obtained from the external system. Further, the controller 29 registers the new link data and the connection information about the new link and the existing link. The new link data and the connection information are registered as a road network, so that the new link is registered in the road map data.

Figure 2:
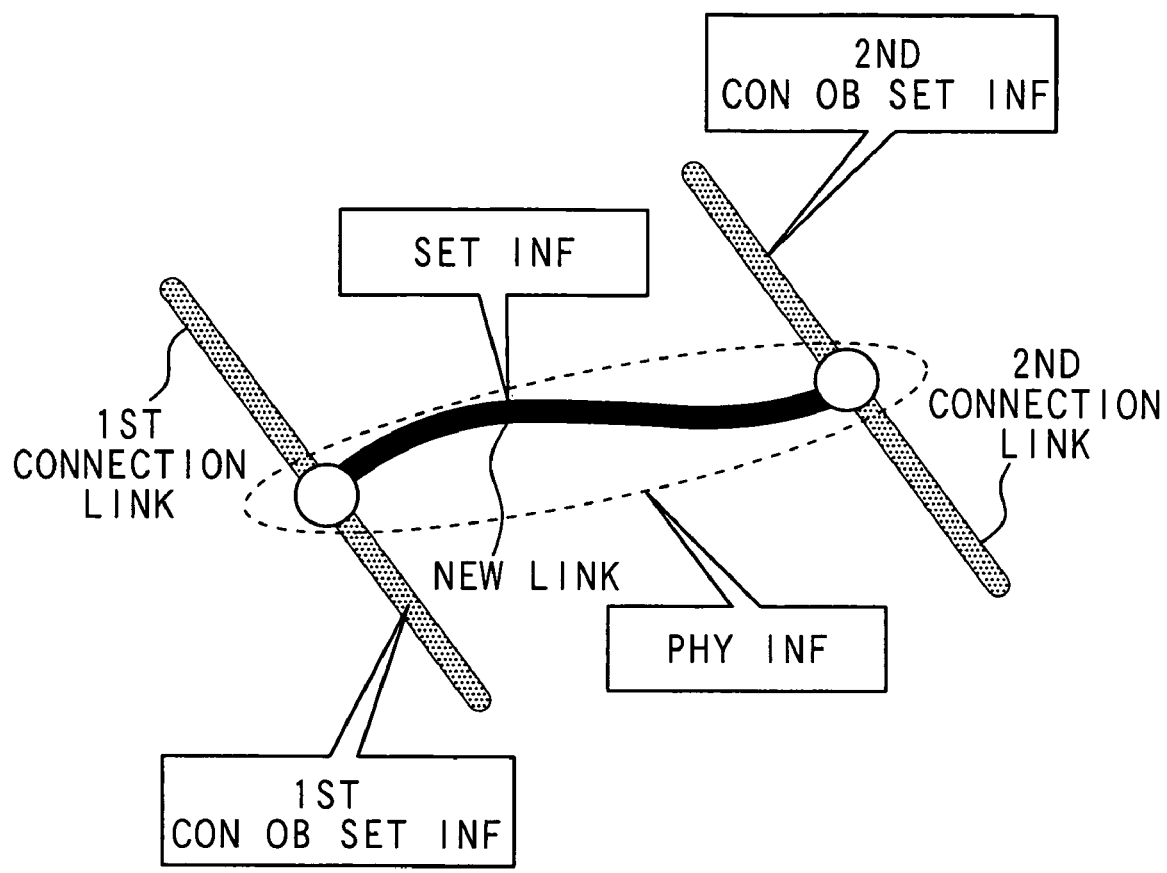
FIG. 2 is a diagram showing new link data.

The contents of the new link data obtained from the external system will be explained as follows. FIG. 2 shows an example of the new link data.

The new link data includes setting information, physical information, and connection object setting information. The setting information defines a setting content of the new link itself. For example, the setting information includes a name of a new road such as Georgetown Avenue, a type of the new road such as a city road, and a road width such as five meters. The physical information defines a position (i.e., coordinates) and a shape of a road segment corresponding to the new link. For example, the physical information includes the coordinates and the shape of the new road. The connection object setting information in FIG. 2 includes a first connection object setting information and a second connection object setting information. The connection object setting information defines a setting content of a connection object link so that the connection object setting information specifies the connection object link to be connected to the new link. For example, the first connection object setting information includes a name of a first connection road such as River Road, a type of the first connection road such as a city road, and a road width such as two meters. The second connection object setting information includes a name of a second connection road such as Capital Highway, a type of the second connection road such as a national road, and a road width such as ten meters. Here, FIG. 2 shows an example such that each end of the new link is connected to a different connection object link. Thus, the connection object setting information includes two different connection object setting information.

Each of the setting information regarding the new link and the connection object setting information regarding the connection object link defines the setting content of the road corresponding to each link, and includes general information such as the name of the road, the type of the road, the road with and the like. Each of the setting information and the connection object setting information do not include specific identification information of the road map database such as a link ID. Here, the specific identification information such as the link ID is assigned to each road map database.

Figure 3:
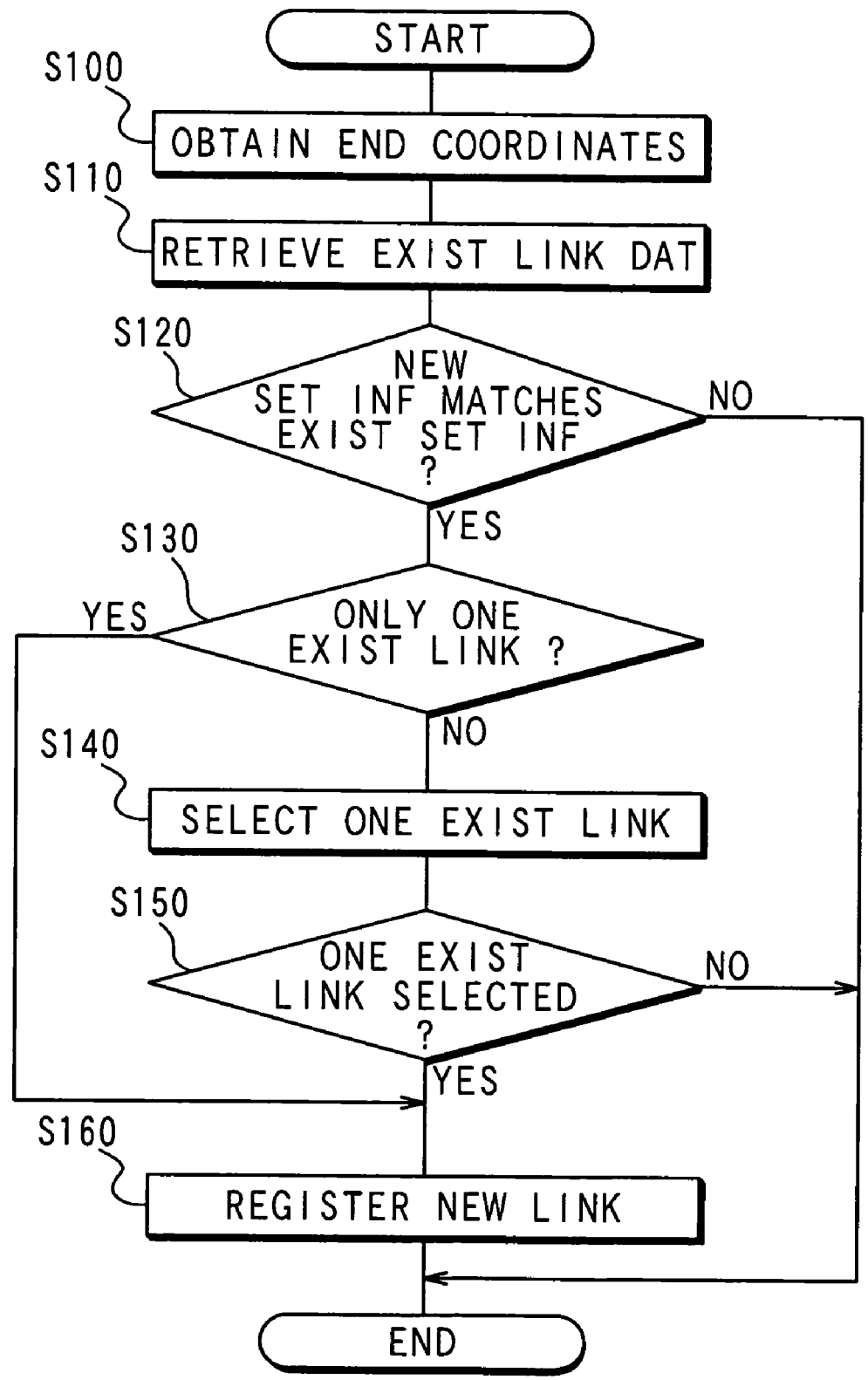
FIG. 3 is a flowchart showing new link connection determination process.

The new link connection determination process executed by the controller 29 will be explained with reference to FIG. 3. FIG. 3 shows a flowchart of the new link connection determination process. The new link connection determination process is executed when the new link data is obtained from the external system.

First, in Step S100, the controller 29 obtains coordinates of each end of the new link according to the physical information of the new link data. Regarding the example in FIG. 2, two sets of coordinates of ends of the new link are obtained. In Step S110, link data of an existing link passing within a predetermined range around the end of the new link as a center of the range is retrieved from the map data stored in the HDD 24. Specifically, the predetermined range is, for example, defined as a circle having a radius of a few meters, and having a center of the coordinates of the end of the new link.

Next, in Step S120, the connection object setting information in the new link data obtained in Step S100 is compared with the setting information in the existing link data retrieved in Step S110, and then, the controller 29 determines whether the connection object setting information of the new link matches the setting information of the existing link. Here, when there are multiple connection object setting information, the controller 29 determines whether each connection object setting information of the new link matches a corresponding setting information of the corresponding existing link. When the controller 29 determines that all of the connection object setting information of the new link does not match the existing setting information, the determination of Step S120 is "NO." Specifically, when there is no setting information of the existing link that matches one of the connection object setting information, the determination of Step S120 is "NO." In this case, the new link connection determination process ends. In this case, the new link obtained from the external system is not registered in the map data.

When the controller 29 determines that one of the connection object setting information of the new link matches corresponding existing setting information, the determination of Step S120 is "YES." In this case, in Step S130, the controller 29 determines whether only one existing link corresponding to one end of the new link exists, the one existing link having the setting information that matches the connection object setting information of the one end of the new link. When the controller 29 determines that only one existing link corresponding to the one end of the new lint exists, the determination in Step S130 is "YES." In this case, the controller 29 determines that the new link connects to the existing link corresponding to the one end of the new link. Then, in Step S160, the link data regarding the new link such as the setting information, the physical information and the like, and the connection information of the new link with the existing link are registered in the road network in the road map data stored in the HDD 24.

In Step S130, when the controller 29 determines that two or more existing links corresponding to the one end of the new lint exists, the determination in Step S130 is "NO." In this case, in Step S140, the display 26 displays a message and/or the sound output device 27 outputs a voice message such that there are multiple existing links that may connect to the one end of the new link. Then, the controller 29 requests the user to select one of the existing links to be connected to the one end of the new link.

Then, in Step S150, the controller 29 determines whether the user selects one of the existing links as the connection object of the one end of the new link. Here, when the controller 29 determines that the user selects one of the existing links, the determination in Step S150 is "YES." In this case, the controller 29 determines that each end of the new link connects to the existing link corresponding to the respective end of the new link, and the existing link includes the selected one of the existing links. In Step S160, the link data regarding the new link such as the setting information, the physical information and the like, and the connection information of the new link with the existing link are registered in the road network in the road map data stored in the HDD 24. When the determines that the user does not select one of the existing links, the determination in Step S150 is "NO." In this case, the new link connection determination process ends. In this case, the new link obtained from the external system is not registered in the map data.

The above device 1 provides the following effects.

The connection object setting information in the new link data obtained from the external system via the communication I/F 23 and the external communication device 28 is compared with the setting information of the existing link disposed near the end of the new link, so that the controller 29 determines without using the specific link ID whether the new link connects to the existing link. The specific link ID is inherent in the road map database. Specifically, the setting content in the connection object setting information of the new link data and the setting content in the setting information of the existing link data includes general information such as the name of the road, the type of the road, the road with and the like. Thus, it is not necessary for the external system to input the specific link ID of the road map database in the device 1. The external system provides the new link data, and the device 1 obtains the new link data from the external system. Accordingly, even when the external system on a provider side does not know the specific link ID of the map database of the device 1 on a user side, the new link on the provider side can be connected to the map network on the user side. Thus, the new link data is provided from the external system, so that the map data in each link is up-dated easily. The convenience of the navigation system is improved.

(Modifications)

In Step S130, connection determination between the new link and the existing link is performed. In the connection determination step of Step S130, in addition to the connection object setting information and the setting information, the shape of the connection object link shown in the new link data may be verified with the shape of the existing link in the existing link data.

In the above case, the new link data obtained from the external system includes connection object physical information, which defines the position (i.e., coordinates) and the shape of the road segment corresponding to the connection object link, in addition to the connection object setting information relating to the connection object link to be connected to the new link.

Then, the device 1 checks the connection object setting information in the new link data with the setting information in the existing link data with regard to the existing link disposed near the end of the new link. Further, the device 1 checks the link shape based on the connection object physical information in the new link data with the link shape based on the physical information of the existing link data. Thus, when the controller 29 determines that the connection object setting information of the new link data matches the setting information of the existing link data, and that the connection object physical information of the new link data matches the physical information of the existing link data, the controller 29 determines that the new link is connected to the existing link.

Thus, in addition to the coordinates of the end of the new link and the connection object setting information, the shape of the connection object link is checked, so that the connection between the new link and the existing link is accurately determined.

In the above embodiment, the device 1 is the navigation device 1 mounted on the vehicle. Alternatively, the device 1 may be a cell phone, a notebook computer, a PDA (i.e., personal digital assistant), or a portable game device having an application soft ware with a navigation function.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A map data utilizing apparatus comprising:
 a road map database for storing a road map data, which includes a link data and road network information, wherein the link data defines a link as a minimum unit of a road segment in the road map data, and includes at least setting information including information including at least one of a road name, a road type and a road width of the link, and the road network information includes connection information showing connection status between links;
 an obtaining device for obtaining new link data without a specific link identification (ID) from an out-of-apparatus external device or a removable external memory medium other than the road map database, wherein the new link data defines a new link, and includes connection object setting information and coordinate information of links, the connection object setting information having information including at least one of a road name, a road type and a road width of a connection object link to be connected to the new link, and the coordinate information having at least coordinates of one end of the new link;
 an extraction device for extracting link data from the road map data stored in the road map database, the link data relating to a link which is disposed in a predetermined geographical area relative to a reference point of the coordinates of the one end of the new link shown in the coordinate information of the new link data obtained by the obtaining device;
 a connection determination device for comparing the connection object setting information of the new link data obtained by the obtaining device with setting information of the extracted link data extracted by the extraction device, and for determining, without the specific link ID and based on comparison results, that the new link is connected to an extracted link when the connection object setting information matches the setting information; and
 a registration device for registering predetermined link data and connection information in a road network of the road map data stored in the road map database, the predetermined link data relating to the new link data of the new link obtained by the obtaining device, and the connection information of the connection object link connecting to the new link determined by the connection determination device,
 wherein a predetermined process is executed using the road map data stored in the road map database.

2. The map data utilizing apparatus according to claim 1,
 wherein the link data of the road map data stored in the road map database further includes shape information showing a shape of the link;
 wherein the new link data obtained by the obtaining device further includes shape information showing a shape of the connection object link to be connected to the new link; and
 wherein the connection determination device compares the connection object setting information of the new link data obtained by the obtaining device with the setting information of the extracted link data extracted by the extraction device, and further compares the shape of the connection object link according to the shape information in the new link data with the shape of the extracted link according to the shape information in the extracted link data, and determines that the new link is connected to the extracted link based on comparison results when the connection object setting information of the new link data matches the setting information of the extracted link data, and the shape of the connection object link matches the shape of the extracted link.

3. The map data utilizing apparatus according to claim 1,
 wherein the map data utilizing apparatus is a navigation device for guiding a route to a specified destination based on the road map data stored in the road map database.

4. The map data utilizing apparatus according to claim 1,
 wherein the obtaining device obtains the new link data without a specific link identification (ID) from one of an out-of-apparatus external information center and an information communication terminal in wireless communication with the obtaining device.

5. The map data utilizing apparatus according to claim 1,
 wherein the obtaining device obtains the new link data without a specific link identification (ID) from a removable external memory card.

6. A map data utilizing apparatus comprising:
 a road map database for storing a road map data, which includes a link data and road network information, wherein the link data defines a link as a minimum unit of a road segment in the road map data, and includes at least setting information including information including at least one of a road name, a road type and a road width of the link, and the road network information includes connection information showing connection status between links;

an obtaining device for obtaining new link data from an external device or external memory medium other than the road map database, wherein the new link data defines a new link, and includes connection object setting information and coordinate information of links, the connection object setting information having information including at least one of a road name, a road type and a road width of a connection object link to be connected to the new link, and the coordinate information having at least coordinates of one end of the new link;

an extraction device for extracting link data from the road map data stored in the road map database, the link data relating to a link disposed in a predetermined geographical area relative to a reference point of the coordinates of the one end of the new link shown in the coordinate information of the new link data obtained by the obtaining device;

a connection determination device for comparing the connection object setting information of the new link data obtained by the obtaining device with setting information of the extracted link data extracted by the extraction device, and for determining, based on comparison results, that the new link is connected to an extracted link when the connection object setting information matches the setting information; and a registration device for registering predetermined link data and connection information in a road network of the road map data stored in the road map database, the predetermined link data relating to the new link data of the new link obtained by the obtaining device, and the connection information of the connection object link connecting to the new link determined by the connection determination device, wherein a predetermined process is executed using the road map data stored in the road map database, the link data of the road map data stored in the road map database further includes shape information showing a shape of the link, the new link data obtained by the obtaining device further includes shape information showing a shape of the connection object link to be connected to the new link, and the connection determination device compares the connection object setting information of the new link data obtained by the obtaining device with the setting information of the extracted link data extracted by the extraction device, and further compares the shape of the connection object link according to the shape information in the new link data with the shape of the extracted link according to the shape information in the extracted link data, and determines that the new link is connected to the extracted link based on comparison results when the connection object setting information of the new link data matches the setting information of the extracted link data, and the shape of the connection object link matches the shape of the extracted link.

* * * * *